United States Patent [19]

Sharak et al.

[11] Patent Number: 5,583,187
[45] Date of Patent: Dec. 10, 1996

[54] HOT MELT ADHESIVES BASED ON HYDROXY-FUNCTIONAL POLYESTERS

[75] Inventors: Matthew L. Sharak, Franklin Park; Charles W. Paul, Madison; Dilip Ray-Chaudhuri, Bridgewater, all of N.J.

[73] Assignee: National Starch and Chemical Investment Holding Corporation, Wilmington, Del.

[21] Appl. No.: 433,578

[22] Filed: May 3, 1995

[51] Int. Cl.⁶ .................................................. C08F 20/00
[52] U.S. Cl. .................. 525/438; 525/54.21; 525/56; 525/57; 525/178; 525/190; 525/404; 525/408; 525/523; 525/530; 525/938; 528/88; 528/112; 528/297; 523/401; 523/500
[58] Field of Search ................................ 525/523, 530, 525/533, 938, 54.21, 56, 57, 178, 190, 404, 408, 438; 528/112, 87, 88, 297; 523/401, 500

[56] References Cited

U.S. PATENT DOCUMENTS

| | | | |
|---|---|---|---|
| 5,098,962 | 3/1992 | Bozich | 525/444 |
| 5,134,201 | 7/1992 | Billovits et al. | 525/423 |
| 5,143,961 | 9/1992 | Scholl et al. | 524/317 |
| 5,169,889 | 12/1992 | Kauffman et al. | 524/270 |
| 5,171,820 | 12/1992 | Mang et al. | 528/87 |
| 5,252,646 | 10/1993 | Iovine et al. | 524/270 |
| 5,356,963 | 10/1994 | Kauffman et al. | 524/43 |
| 5,387,623 | 2/1995 | Ryan et al. | 523/124 |

FOREIGN PATENT DOCUMENTS

| | | |
|---|---|---|
| 1468736 | 7/1963 | Germany . |
| 1207372 | 2/1988 | Japan . |
| 1193381 | 8/1989 | Japan . |
| 6017018 | 6/1992 | Japan . |
| 6247064 | 2/1993 | Japan . |
| 06228508 | 8/1994 | Japan . |

OTHER PUBLICATIONS

"Mechanical Properties of Proprietary High Modulus Degradable Polymers–Injection Molded," Dow Chemical Company Technical Literature, Oct. 1994.

"Sucrose Benzoate", Product Information Bulletin, Velsicol Chemical Corporation, Dec. 1, 1978.

"Sucrose Benzoate Alcohol Soluble", Product Information Bulletin, Velsicol Chemical Corporation, Jun., 1991.

*Primary Examiner*—John C. Bleutoe
*Assistant Examiner*—Randy Gulakowski
*Attorney, Agent, or Firm*—Ellen T. Dec

[57] ABSTRACT

Hot melt adhesive compositions, particularly biodegradable hot melt adhesives are prepared from 10 to 90% by weight of a thermoplastic methylol polyester prepared from the reaction of at least one dicarboxylic acid with a diglycidyl ether, a diglycidyl ester or a combination thereof; 0 to 90% by weight of a compatible tackifier; 0 to 80% by weight of a compatible plasticizer; 0 to 50% by weight of a compatible wax diluent and 0 to 3% by weight of a stabilizer.

14 Claims, No Drawings

HOT MELT ADHESIVES BASED ON HYDROXY-FUNCTIONAL POLYESTERS

BACKGROUND OF THE INVENTION

This invention relates to hot melt adhesives, and particularly to hot melt adhesives which are compostable or biodegradeable and which are based on specific thermoplastic polymers containing at least one hydroxy group per repeat unit.

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs. Depending on the desired use, the degree of tack of the hot melt adhesives may be varied over a wide range to produce adhesives varying from pressure sensitive to non-pressure sensitive in character. Non-pressure sensitives are used, for example, in bookbinding, bag ending, case and carton sealing. Pressure sensitive hot melts are used in many applications, and particularly in disposables such as diapers, sanitary products and the like, where room temperature tack and long open time are often required.

Hot melt adhesives have historically been based on petroleum derived polymers such as polyethylene, ethylene-vinyl acetate, styrenic block copolymers, and polypropylene to name a few. These compositions are further tackified, plasticized, and reinforced with a variety of resins, oils and waxes which are derived from both petroleum and naturally occurring feedstocks such as wood, gum and tall oil rosin and terpenes. These classic compositions are generally very resistant to degradation once the articles employing them are disposed of.

The present invention stems from the growing movement to utilize raw materials which have demonstrated some level of degradation. Such compositions advance the state of the art of hot melt adhesives by allowing for the development of hot melt adhesives which either degrade naturally after coming in contact with the soil or which can be composted.

It has been suggested to use various biodegradeable polymers such as hydroxybutyrate/hydroxyvalerates and polylactide homo- or copolymers as the base polymers in hot melt adhesives; however, these prior biodegradeable adhesives suffer with respect to their mechanical and thermal stability when compared with other conventional hot melt adhesives.

SUMMARY OF THE INVENTION

We have now found that the use of certain hydroxy functional polyesters as the base polymers in hot melt adhesives provides adhesives with improved thermal stability. Due to the polarity of the base polymers, they are also highly compatible with other biodegradeable ingredients and may be formulated with various additives to provide a range of pressure sensitive to non-pressure sensitive hot melt adhesives for environmentally sensitive applications.

The specific polyesters utilized herein were designed for film and injection molding applications and have not heretofore been used as the base polymer for hot melt adhesives.

In its broadest aspect, the present invention is directed to hot melt adhesive compositions comprising 10 to 90% by weight of a thermoplastic methylol polyester prepared from the reaction in the presence of an onium catalyst of at least one dicarboxylic acid with a diglycidyl ether, a diglycidyl ester or a combination thereof; 0 to 90% by weight of a compatible tackifier; 0 to 80% by weight of a compatible plasticizer; 0 to 50% by weight of a compatible wax diluent and 0 to 3% by weight of a stabilizer.

It will be recognized that the general formulations described above can be adapted to include a wide variety of hot melt adhesive compositions, the more precise formulations of which will vary depending upon the specific end use, the knowledge of which is readily available to those skilled in the particular art. Thus, in general, pressure sensitive adhesives can be prepared using 10 to 90% by weight of the polyester, preferably in its essentially amorphous form, 10 to 90% of a tackifying resin, 10 to 80% plasticizer and 0 to 3% of a stabilizer. Preferred pressure sensitive adhesives are prepared using 10 to 50% of the polyester; 20 to 60% of a tackifying resin, preferably sucrose benzoate; and 20 to 40% of a plasticizer, preferably a diethylene glycol benzoate. Lower levels of plasticizer may also be employed to produce adhesives useful for various end uses such as in construction adhesives for disposable products where some initial degree of tack is needed but no residual pressure sensitive properties are required.

In general, non-pressure sensitive adhesives can be prepared using 10 to 90% by weight of the polyester, preferably in the crystalline form, 10 to 90% tackifying resin, 0 to 50% of a wax-like diluent, 0 to 70% plasticizer and 0 to 3% of a stabilizer. Preferred non-pressure sensitive adhesives are prepared using 20 to 60% of the polyester; 10 to 40% sucrose benzoate; 0 to 50% of a plasticizer, preferably a diethylene glycol benzoate; and 0 to 20% of a wax-like diluent, preferably hydrogenated castor oil, N,N'-ethylenebisstearamide or N-(2-hydroxyethyl)-12-hydroxy stearamide.

DETAILED DESCRIPTION OF THE INVENTION

The major component of the adhesive of the invention, present in an amount of 10 to 90% by weight of the adhesive, comprises a thermoplastic methylol polyester containing repeating units of the formula:

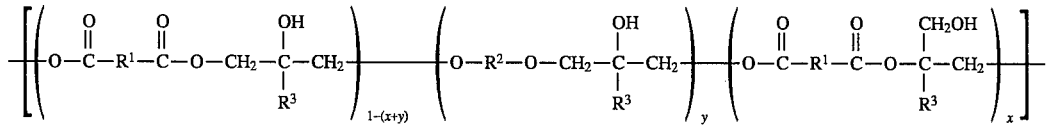

wherein each of $R^1$ and $R^2$ is independently a divalent organic moiety which is predominantly hydrocarbon, each $R^3$ is individually hydrogen or lower alkyl, y is a fraction from 0 to 0.5 and x is a fraction from about 0.05 to about 0.4.

These polyesters are prepared by reacting a dicarboxylic acid or a mixture of two or more dicarboxylic acids with a diglycidyl ether, a diglycidyl ester or a combination thereof, generally in the presence of an onium catalyst.

Depending upon the particular starting materials, the resulting polymer will be either crystalline, semi-crystalline or amorphous in nature.

In the preferred methylol polyesters of this invention, each of $R^1$ and $R^2$ is independently (1) an aliphatic, hydrocarbon, divalent moiety such as alkylene, cycloalkylene and alkenylene, advantageously those having from 2 to 10 carbons or (2) an aliphatic heteroatomic moiety having an alkylene or cycloalkylene groups which are interrupted by a heteroatomic moiety such as oxygen, sulfur, imino, sulfonyl, carboxyl, carbonyl and sulfoxyl. Of these aliphatic divalent moieties, the alkylenes, such as ethylene, propylene, butylene and decene, and the cyclo-aliphatics such as cyclohexene, are more preferred.

Alternatively, each of $R^1$ and $R^2$ may be independently divalent aromatic moiety such as arylene, alkylenearylene, dialkylenearylene, diaryleneketone, diarylenesulfone, diarylenesulfoxide, alkylidene-diarylene, diarylene oxide, diarylene sulfide and diarylenecyanomethane. Examples of divalent aromatic moieties include p-phenylene, m-phenylene and naphthalene, diphenylene-isopropylidene, 3,3'-dialkyldiphenylene-isopropylidene, diphenylenemethane, 3,3',4,4'-tetraalkyldiphenylene-isopropylidene, and the corresponding alkyl-substituted derivatives of the other named divalent aromatic moieties.

The use of polyesters in which the $R^1$ and/or $R^2$ moiety is an aliphatic or cyclo-aliphatic residue leads to hot melt adhesives which are more readily biodegradable than if the moiety is aromatic. It is therefore preferred that at least one of the moieties, particularly the $R^1$ moiety be aliphatic.

In preferred embodiments, x is preferably a number from 0.05 to 0.4, most preferably from 0.1 to 0.3, and y is preferably from 0 to 0.5. Each $R^3$ is individually hydrogen or a hydrocarbyl or substituted hydrocarbyl wherein hydrocarbyl is a monovalent hydrocarbon such as alkyl, cycloalkyl, aralkyl, or aryl and the substituent(s) is a monovalent moiety which is inert in the reactions used to prepare the methylol polyester. The polyesters are most preferably those represented by the formula:

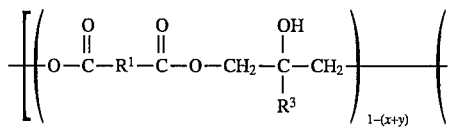

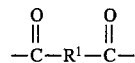

The polyesters are optionally terminated by including monofunctional acids or glycidyl compounds by methods well known to those skilled in the art.

Examples of suitable diacids include (1) aromatic diacids such as phthalic, terephthalic and isophthalic acids and biphenyl and naphthalene dicarboxylic acids, as well as (2) aliphatic diacids such as adipic, suberic and sebacic acids. In addition, mixtures of different diacids can be suitably employed. Of these diacids, dodecanoic and 1,4-dicarboxyl cyclohexane are most preferred.

Examples of suitable dihydric phenols include 4,4'-isopropylidene bisphenol (bisphenol A), 4,4'-dihydroxydiphenylethylethane, 3,3'-dihydroxydiphenyldiethylmethane, 3,4'-dihydroxydiphenylmethyl-propylmethane, bisphenol, 4,4'-dihydroxydiphenyloxide, 4,4'-dihydroxydiphenylcyanomethane, 4,4'dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4'-dihydroxynaphthalene, catechol, resorcinol, hydroquinone and other dihydric phenols listed in U.S. Pat. Nos. 3,395,118; 4,438,254 and 4,480,082 which are hereby incorporated by reference. In addition, mixtures of different dihydric phenols can be employed. Of these other dihydric phenols, bisphenol A, hydroquinone and mixtures thereof are most preferred.

Examples of preferred onium catalysts include tetrahydrocarbyl quaternary ammonium halides wherein hydrocarbyl is a monovalent hydrocarbon radical such as alkyl, aryl, cycloalkyl, aralkyl and alkaryl, preferably having from 1 to

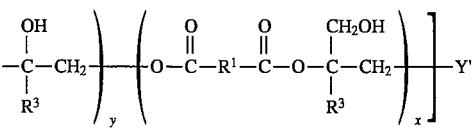

wherein $R^1$, $R^2$, $R^3$, x and y are as defined above. Typically Y is hydrogen or glycidyl and Y' is glycidyl arylene ether, glycidyl alkyene ester, glycidyl alkylene ether or glycidyl arylene ester.

The polyesters are preferably prepared by contacting one or more diglycidyl ethers of a dihydric phenol with one or more diacids or anhydrides under conditions including the use of an onium catalyst sufficient to cause the acid moieties to react with epoxy moieties to form a polymer backbone having ether linkages and pendant methylol moieties. When such diglycidyl ethers are employed, the preferred $R^2$ are aromatic or aliphatic residues. Optionally a diglycidyl ester of a dicarboxylic acid can be employed. Where diglycidyl esters rather than diglycidyl ethers are employed, $R^2$ is selected from the group 16 carbons. Examples of such preferred onium catalysts include tetrakis(n-butyl)ammonium bromide and the corresponding chloride, iodide and fluoride, with tetrakis(n-butyl)ammonium bromide being most preferred. Other suitable onium catalysts include tetrahydrocarbyl phosphonium halides such as ethyltriphenylphosphonium iodide and tetraphenylphosphonium bromide.

The polyesters are suitably prepared at temperatures in the range from about 60° to about 160° C. under an inert atmosphere.

These polymers and their preparation are described in more detail in U.S. Pat. No. 5,171,820 issued Dec. 15, 1992 to Mang et al. Alternatively, they are available from Dow Chemical. One such product is the crystalline material having a Tg of 10° C. derived from hydroquinone diglycidyl ether and 1,10-decandicarboxylic acid, having the structure:

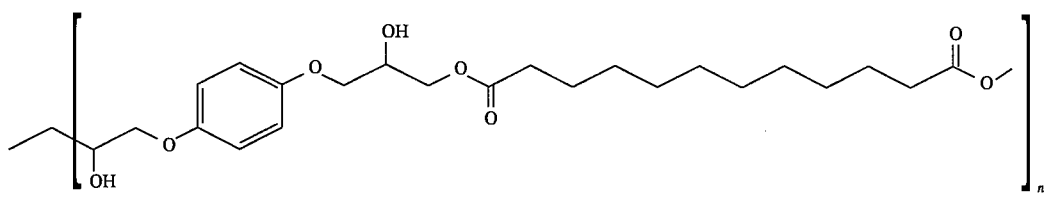

Another such product is essentially amorphous, having a Tg of 69° C., a poly(ester, ether) derived from bisphenol A diglycidyl ether and 1,4-cyclohexanedicarboxylic acid, having the structure:

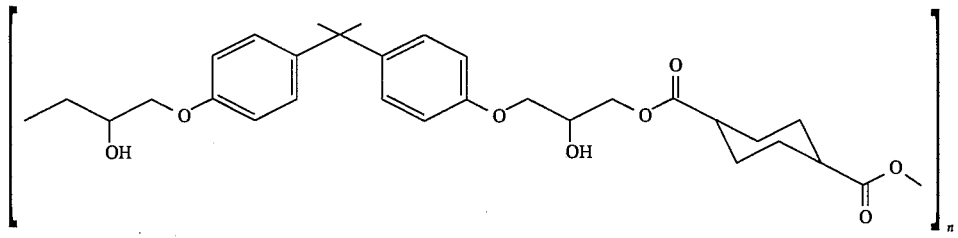

The crystalline, semi-crystalline or amorphous nature of the polymer will also dictate the compatibility of the polymer with the other raw materials used in the adhesive formulation.

In the case of the tackifying resins, we have found terpene phenolic resins to be compatible with the crystalline form of the polymer. Sucrose benzoate, however, is compatible with both the crystalline and amorphous forms and is preferable for use in these adhesives since it is also biodegradeable and compostable. The sucrose benzoate is preferably utilized in its alcohol soluble form wherein the benzoate is partially esterified. This grade is a light colored, clear non-crystalline solid with a softening point of about 95° C. Alternatively, the non-alcohol organic soluble grade, a water-clear, non-crystalline flake solid having a softening point of 98° C. may also be used. Both grades are available commercially from Velsicol Chemical Corporation.

Depending on the end-use application, and particularly for uses requiring pressure sensitive properties, various compatible plasticizing or extending oils may also be present in the composition. Preferred compatible plasticizers include phthalate plasticizers such as dioctyl phthalate; liquid polyesters such as Dynacol 720 from Hüls; benzoate plasticizers such as diethylene glycol dibenzoate (e.g., Benzoflex 50 from Velsicol) and diethylene glycol benzoate where the mole fraction of hydroxyl groups which have been esterified ranges from 0.5 to 0.95 (e.g., Benzoflex 2-45 High Hydroxy from Velsicol); phosphate plasticizers such as t-butylphenyl diphenyl phosphate (e.g., Santicizer 154 available from Monsanto); poly(ethylene glycols) and derivatives thereof such as the phenyl ether of poly(ethylene glycol) (e.g., Pycal 94 available from ICI) as well as liquid rosin derivatives having Ring and Ball melting points below about 60° C. such as the methyl ester of hydrogenated rosin (e.g., Hercolyn D from Hercules); as well as vegetable and animal oils such as glyceryl esters of fatty acids and polymerization products thereof: Preferred plasticizers for use in biodegradable compositions include Santicizer 160, Benzoflex 50, Benzoflex 2–45 High Hydroxy and Citroflex 2, with Benzoflex 2-45 High Hydroxy most preferred.

Other applications conventionally employing adhesives based on these polyester polymers may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties.

Suitable waxes include N-(2-hydroxyethyl)-12-hydroxy stearamide wax, hydrogenated castor oil, oxidized synthetic waxes, N,N'ethylenebisstearamide, poly(ethylene oxide) having a weight average molecular weight above about 1000 and functionalized synthetic waxes such as carbonyl containing Escomer H101 from Exxon.

It should be recognized that some adhesive formulations described herein may contain both wax and plasticizer components so that the presence of one or the other is not mutually exclusive.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxy-benzyl)-benzene; pentaerythritol tetrakis-3-(3,5-di-tert-butyl-4-hydroxyphenyl)propionate; n-octadecyl 3,5-di-tert-butyl-4-hydroxyphenyl) propionate; 4,4'-methylenebis (2,6-di-tert-butylphenol); 4,4'-thiobis (6-tert-butyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa[3-(3,5-di-tert-butyl-4-hydroxyphenyl)propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc. There may also be present in the adhesive small amounts (e.g., less than about 20% by weight, and preferably 5 to 20% by weight) of certain thermoplastic polymers such as ethylene vinyl acetate, ethylene acrylic acid, ethylene methyl acrylate and ethylene n-butyl acrylate copolymers containing about 12 to 50% vinyl or acrylate comonomer as well as polylactide, poly(hydroxy butyrate hydroxy valerate) or caprolactone polymers or aliphatic polyesters such as Dynapol polymers from Hüls. These polymers are employed in order to impart flexibility, toughness and strength. Alternatively and in particular, it may be desirable to incorporate into the hot melt adhesive up to 20% by weight of certain hydrophilic polymers such as polyvinyl alcohol, hydroxyethyl cellulose, hydroxypropyl cellulose, polyvinyl methyl ether, poly(ethylene oxide), polyvinyl pyrrolidone, polyethyloxazoline, or starch or cellulose esters, particularly the acetates with a degree of substitution (DS)<2.5 which will function to increase the water sensitivity of the adhesives which may be desired for some applications.

These hot melt adhesive compositions may be formulated using techniques known in the art. An exemplary procedure involves placing approximately 40% of the total tackifying resin concentration with all the polymer, wax, plasticizers and stabilizers in a jacketed mixing kettle, preferably in a jacketed heavy duty mixer, which is equipped with rotors and thereupon raising the temperature to a range of from up to about 190° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

The adhesives disclosed herein may be employed in a wide variety of uses as are known in the art. The adhesives described herein may be effectively utilized in a variety of packaging and carton sealing applications. The non-pressure sensitive adhesives may also be used to bind a plurality of sheets in a wide range of bookbinding operations. They may also be used for laminating tissue and/or screen-reinforced tissue layers such as are used in individual or roll use applications as in wipers, paper towels, toilet tissue and other consumer or industrial end uses. When formulated with plasticizers, the resultant adhesives may be used in the assembly or construction of various disposable applications including, but not limited to, sanitary napkins, disposable diapers, hospital gowns, bed pads and the like. In particular, adhesives are useful for the assembly of disposable articles using multi-line or spray construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrate so as, for example, to impart elongation resistant gathers thereto. The adhesive may also be utilized in less demanding disposable construction applications such as for end or perimeter sealing.

In the following illustrative examples all parts are given by weight and all temperatures in degrees Celsius unless otherwise noted.

EXAMPLES

In preparing the following samples, a heavy duty mixer which had been heated to 165° C. and which was equipped with a stirring paddle was charged with 40% of the tackifying resin and/or diluent. After melting of the resins, stirring was then initiated whereupon the polyester was added slowly at 165° C. over a one-half hour period after which the temperature was lowered to 150° C. Heating and stirring were continued until a homogeneous mass was obtained whereupon the remainder of the tackifying resin and/or diluent was admixed therewith.

The samples were tested using the following procedures:

Viscosity measurements were determined after 30 minutes using a Brookfield viscometer (Spindle 27) at 250° F.

The adhesive was also subjected to Peel/Shear testing such as is conventionally required in the packaging industry. Peel Temperature Test: A bead of test adhesive approximately ⅛ inch in diameter is applied at 325° F. to 350° F. with a glass rod onto 60 pound/ream kraft paper. A second sheet of the same paper is superimposed on the first sheet within 2 seconds and pressed thereto to form a kraft-to-kraft bond. The bonded sheets are then cut perpendicular to the adhesive line into 1 inch wide strips. Duplicate bonded specimens are placed in an oven with one free end of the specimen attached to a fixed support and a 100 gram load suspended from the other sheet at the same end of the bond. The oven temperature is then increased in 10° F. increments at 15 minute intervals. The temperature at which bond delamination occurred is specified as the peel temperature.

Shear Temperature Test

Samples are prepared as in peel temperature test but separate sheets of Kraft at opposite ends of the bonded specimen are suspended and weighted to stress the bond in a shear mode. The temperature of the oven is increased as in peel test until failure occurs.

Adhesion Test

A molten bead of hot melt at 325° F. to 350° F. was drawn across the middle (widthwise) of a 1"×3" strip of corrugated paper. A second strip of corrugated paper was then immediately superimposed upon the first and a 50 gram weight placed on top of the construction. The kraft-to-kraft bonds were then aged 24 hours at room temperature. After aging, the samples were stressed by hand at the temperature noted (0° F., 20° F. or 40° F.) in a 90° peel mode. The presence of fiber tear indicates excellent adhesion.

Tack and Range were measured by drawing out a 3 mil thick adhesive film and qualitatively measuring the tack by determining how many successive finger prints could be made in the film before it set. The range or open time indicates the number of seconds during which the finger prints can be made. Cigarette plug adhesion was measured by applying a bead of adhesive to cigarette plug paper, forming a bond and conditioning the bond for 24 hours at room temperature. After conditioning, the bonds were pulled at 180° mode by hand.

Some of the adhesives were also tested for thermal stability by storing at 275° F. for 24 hours and then noting the appearance of the adhesive.

Examples 1 and 2 show typical formulations of the invention in non-pressure sensitive packaging case and carton seal type application. In these examples the crystalline poly(ether, ester) formed from the reaction of hydroquinone diglycidyl ether with 1,10-decandicarboxylic acid was employed (CRY) together with an alcohol soluble grade of partially esterified sucrose benzoate having a Ring and Ball Softening Point of 95° C. available from Velsicol Chemical Corporation. These formulations have low viscosity and good high temperature performance as can be seen from the good peel/shear values. Also, the products have good low temperature performance as is demonstrated by the good adhesion to corrugated at low temperatures. Lastly, these products have excellent adhesion to cigarette plug wrap.

TABLE I

| EXAMPLES | 1 | 2 |
|---|---|---|
| CRY | 50 | 50 |
| Sucrose Benzoate | | 20 |
| Benzoflex 2-45 High Hydroxyl | 30 | 10 |
| Paracin 220 | 20 | 20 |
| Irganox 1010 | 0.5 | 0.5 |
| Viscosity (cp) @ 250° F. | 5,612 | 10,920 |
| Peel (F) | 100 | 110 |
| Shear (F) | 180 | 180 |
| Tack | Slightly Aggressive | Aggressive |
| Range | 3 seconds | 4 seconds |
| Corrugated Adhesion | | |
| 0° F. | 50% | 80% |
| 20° F. | 70% | 85% |
| 40° F. | 70% | 85% |
| Cigarette Plug Wrap Adhesion | Excellent | Excellent |

Paracin 220: N-(2-hydroxyethyl)-12 hydroxy stearamide from Cas Chem

The test results presented above show the adhesives to be particularly suitable for packaging applications such as case and carton sealing due to its low viscosity, good fiber tear and acceptable peel and shear values.

Another series of hot melt adhesives were formulated into pressure sensitive formulations using an essentially amorphous poly(ether, ester) derived from the reaction of bisphenol A diglycidyl ether and 1,4-cyclohexanedicarboxylic acid (AMP) together with the alcohol soluble partially esterified sucrose benzoate.

The compositions and test results are shown in Tables II and III.

TABLE II

| EXAMPLE | 3 |
|---|---|
| AMP | 25 |
| Sucrose Benzoate | 40 |
| Benzoflex 2–45 High Hydroxyl | 35 |
| Irganox | 0.5 |
| Comments | Good compatibility |
| Viscosity (cp) | |
| @ 275° F. | 4115 |
| @ 300° F. | 2250 |

The resultant adhesive was evaluated and found to give a clear water white product. Poly/non-woven bonds were made by heating the adhesive to approximately 135° C. and applying a thin bead of adhesive onto the polyethylene and quickly mating the non-woven and next applying compression with a 200 g weight or rolling over the bond with a 5 lb. roller. The bonds were then pulled by hand and gave deformation of the substrate which indicated good penetration and good adhesion properties.

In the following formulations several waxes were evaluated with the amorphous grade of the poly(ether, ester).

TABLE III

| EXAMPLE | 4 | 5 | 6 | 7 |
|---|---|---|---|---|
| AMP. | 20 | 20 | 20 | 20 |
| Sucrose Benzoate | 40 | 40 | 40 | 40 |
| Castor Wax | 10 | | | |
| Kemamide W-40 | | 15 | | |
| Paracin 220 | | | 15 | 15 |
| Benzoflex 50 | | | | 25 |
| Benzoflex 2–45 High Hydroxyl | 30 | 25 | 25 | |
| Irganox 1010 | 0.5 | 0.5 | 0.5 | 0.5 |
| Comments | Compatible | Compatible | Compatible | Compatible |
| Viscosity (cp) | | | | |
| @ 250° F. | | | 2,485 | Not tested |
| @ 275° F. | 1,340 | 4,100 | 1,290 | |
| @ 300° F. | 735 | 1,420 | 715 | |
| Corrugated Adhesion | | | | |
| 0° F. | 10% | Not tested | 0% | 0% |
| 20° F. | 20% | | 0 | 0 |
| 40° F. | 95% | | 10 | 10 |
| Peel (°F.) | 100 | | 130 | 140 |
| Shear (°F.) | 100 | | 170 | 170 |
| Tack | Aggressive | Very Aggressive | Very Aggressive | Very Aggressive |
| Range (seconds) | 8 | 1 | 5 | 2 |

Castor Wax, Cas Chem: Hydrogenated castor oil
Kemamide W40, Witco: N,N'-ethylenebisstearamide As the results indicate, all of the waxes evaluated were compatible with the amorphous poly(ether, ester) in the formulations. In Examples 4, 5, 6 and 7 the low temperature performance was not within acceptable levels; however, the high temperature performance was within acceptable level. As mentioned above, this grade of polymer is best suited for, but not limited to pressure sensitive type applications, such as in the construction of disposable articles where low temperature performance is not critical.

The following experiment demonstrates the improved utility of the poly(ester, ether) in an adhesive formula as the base polymer versus a polylactide, available commercially from Eco Chem as PLA-Star.

TABLE IV

| | 8 | 9 |
|---|---|---|
| Polylactide | 40 | |
| CRY. | | 40 |
| Nirez 300 | 40 | 40 |
| Citroflex 2 | 20 | |
| Benzoflex 50 | | 20 |
| Irganox 1010 | 0.5 | |
| Viscosity (cp) | | |
| @ 250° F. | 10,975 | 11,363 |
| @ 275° F. | 4,375 | 5,713 |
| @ 300° F. | Unstable | 2,905 |
| @ 325° F. | | 1,660 |
| Heat Stability: 24 Hr. @ 275° F. | | |
| Color (Molten) | Amber | Amber |
| Skin | None | None |
| Gel | None | None |
| Separation | None | None |
| Viscosity @ 275° F. | 3,488 | 7,688 |
| Δ | −20% | +34% |

This example demonstrates the superior thermal stability of the poly(ester, ether). The viscosity of Example 9 can be measured up to 325° F., compared to Example 8, a polylactide based formulation, whose viscosity can only be measured up to 275° F., beyond which the viscosity is unstable, in that it continues to drop over time at these high temperatures.

We claim:

1. A hot melt adhesive composition comprising 10 to 90% by weight of a thermoplastic methylol polyester prepared from the reaction of at least one dicarboxylic acid with a diglycidyl ether, a diglycidyl ester or a combination thereof; 10 to 90% by weight of a compatible tackifier; 0 to 80% by weight of a compatible plasticizer; 0 to 50% by weight of a compatible wax diluent and 0 to 3% by weight of a stabilizer; said adhesive being compostable or biodegradeable.

2. The hot melt adhesive of claim 1 wherein the thermoplastic methylol polyester containing repeating units of the formula:

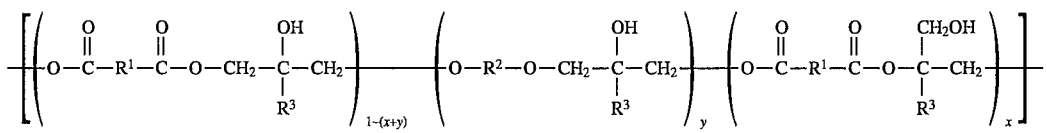

wherein each of $R^1$ and $R^2$ is independently a divalent organic moiety which is hydrocarbon, each $R^3$ is individually hydrogen or lower alkyl, y is a fraction from 0 to 0.5 and x is a fraction from about 0.05 to about 0.4.

3. The hot melt adhesive of claim 2 wherein each of $R^1$ and $R^2$ is independently a (1) an aliphatic, hydrocarbon, divalent moiety such as alkylene, cycloalkylene and alkenylene having from 2 to 10 carbons or (2) an aliphatic heteroatomic moiety having an alkylene or cycloalkylene groups which are interrupted by a heteroatomic moiety selected from the group consisting of oxygen, sulfur, imino, sulfonyl, carboxyl, carbonyl and sulfoxyl.

4. The hot melt adhesive of claim 2 wherein $R^1$ is an aliphatic, hydrocarbon, divalent moiety such as alkylene, cycloalkylene and alkenylene having from 2 to 10 carbons or an aliphatic heteroatomic moiety having an alkylene or cycloalkylene groups which are interrupted by a heteroatomic moiety selected from the group consisting of oxygen, sulfur, imino, sulfonyl, carboxyl, carbonyl and sulfoxyl and $R^2$ is an aromatic divalent moiety.

5. The hot melt adhesive of claim 1 wherein the polyester is a crystalline material having a Tg of 10° C. derived from the reaction of hydroquinone diglycidyl ether and 1,10-decandicarboxylic acid.

6. The hot melt adhesive of claim 1 wherein the polyester is an amorphous material having a Tg of 69° C. derived from bisphenol A diglycidyl ether and 1,4-cyclohexanedicarboxylic acid.

7. The hot melt adhesive of claim 1 wherein there is also present in the adhesive less than 20% by weight of thermoplastic polymers selected from the group consisting of ethylene vinyl acetate, ethylene acrylic acid, ethylene methyl acrylate and ethylene n-butyl acrylate copolymers containing 12 to 50% vinyl or acrylate comonomers; polylactide; starch or cellulose esters having a degree of substitution less than 2.5; poly(hydroxy butyrate hydroxy valerate) or caprolactone polymers and aliphatic polyesters.

8. The hot melt adhesive of claim 1 wherein there is also present in the adhesive up to 20% by weight of a hydrophilic polymer selected from the group consisting of polyvinyl alcohol, hydroxyethyl cellulose, hydroxypropyl cellulose, polyvinyl methyl ether, poly(ethylene oxide), polyvinyl pyrrolidone and polyethyloxazoline, cellulose acetate or starch acetate with a DS<2.5.

9. A pressure sensitive hot melt adhesive composition comprising 10 to 90% by weight of a thermoplastic methylol polyester prepared from the reaction of at least one dicarboxylic acid with a diglycidyl ether, a diglycidyl ester or a combination thereof; 10 to 90% of a compatible tackifying resin, 10 to 80% of a compatible plasticizer and 0 to 3% of a stabilizer.

10. The pressure sensitive adhesive of claim 9 wherein the polyester is essentially amorphous in character.

11. The pressure sensitive adhesive of claim 9 comprising 10 to 50% of the polyester; 20 to 60% of a sucrose benzoate; and 20 to 40% of the plasticizer.

12. A hot melt non-pressure sensitive adhesive comprising 10 to 90% by weight of a thermoplastic methylol polyester prepared from the reaction of at least one dicarboxylic acid with a diglycidyl ether, a diglycidyl ester or a combination thereof; 10 to 90% of a compatible tackifying resin; 0 to 50% of a compatible diluent, 0 to 70% of a compatible plasticizer and 0 to 3% of a stabilizer.

13. The non-pressure sensitive adhesive of claim 12 wherein the polyester is crystalline in character.

14. The non-pressure sensitive adhesive of claim 12 comprising 20 to 60% of the polyester; 10 to 40% sucrose benzoate; 0 to 50% of a compatible plasticizer, and 0 to 20% of a wax-like diluent selected from the group consisting of hydrogenated castor oil, N,N'-ethylenebisstearamide and N-(2-hydroxyethyl-12-hydroxy stearamide.

* * * * *